Oct. 24, 1967    U. R. JAEGER    3,349,224
HEATING UNIT
Filed Jan. 25, 1965

INVENTOR.
ULRIC R. JAEGER
BY
ATTORNEY

United States Patent Office 3,349,224
Patented Oct. 24, 1967

3,349,224
HEATING UNIT
Ulric R. Jaeger, Greenwich, Conn., assignor to Olin Mathieson Chemical Corporation, a corporation of Virginia
Filed Jan. 25, 1965, Ser. No. 427,576
3 Claims. (Cl. 219—540)

This invention relates to heating units, and more particularly to a heating unit including an electric heating element.

Heating units employing an electric heating element have various applications; for example, they may be used as range top burners, as space heaters, or as fluid immersion heaters. The prior art devices for such applications traditionally consist of an insulated resistance wire surrounded by a tubular metal sheath formed in the desired pattern, for example in a spiral pattern for use as a range top burner. Obviously, in such construction the distribution of the heat generated is necessarily in a pattern corresponding to the pattern of the heating element. Accordingly, an even distribution of heat across the entire area desired to be heated is not achievable by such devices. To remedy this disadvantage, it has been suggested that the heating element might be embedded in a solid plate of metal, so as to conduct the heat across the entire surface of the area desired to be heated. While such devices improve the heat distribution somewhat, the improvement depends solely upon conduction through the material of the plate; additionally, such devices require relatively long periods to heat and cool, and are of excessive weight.

By the instant invention it has been found that a greatly improved heating unit is achieved by embedding the heating element within a body of previous material. Such a construction yields advantages not attainable by the solid plate prior art devices. In addition to the conduction of heat from the heating element through the material of the plate, additional heat transfer may take place between the particles of the pervious body and a fluid flowing through the pores of the body.

Thus, it is an object of the present invention to provide an improved electric heating unit.

It is a further object of the present invention to provide such a heating unit having improved heat conduction and heat distribution characteristics.

It is a further object of this invention to provide such a heating unit which allows for the passage therethrough of a heat exchange fluid, thus allowing for additional exchange of heat.

Other objects and advantages will become apparent to those skilled in the art as a detailed description of a particular embodiment proceeds with reference to the drawings which form a part hereof, and in which.

Figure 1:
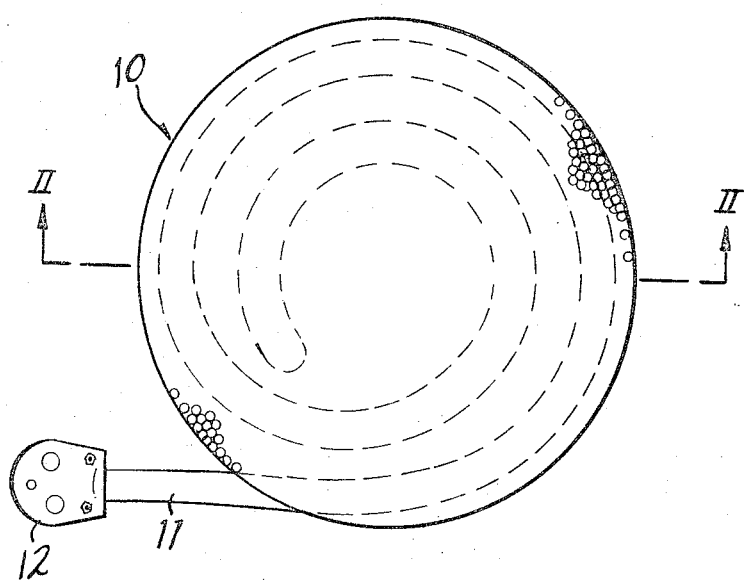
FIGURE 1 is a plan view of a heating unit according to this invention showing an electric heating element in place within the unit.

Referring now to FIGURE 1 of the drawings, there is shown a heating unit 10 according to this invention having embedded therein an electric heating element 11, shown in phantom lines, which element extends outwardly from a portion of the unit 10 and is connected to a suitable electrical connector 12. As will be obvious to those skilled in the art, by suitable connection of the coil 11 to a source of electrical power through electrical connector 12, a desired amount of heat may be generated in the element 11 embedded within the heating unit 10.

The unit 10 depicted in FIGURE 1 is by way of example only, it being understood that configuration of the unit 10, as well as the configuration of the element 11, may take any desired form. That shown in FIGURE 1 is particularly adapted to use as a range top burner, it being clear that the top of the heating unit 10 is particularly well adapted for supporting a cooking utensil.

Figure 2:
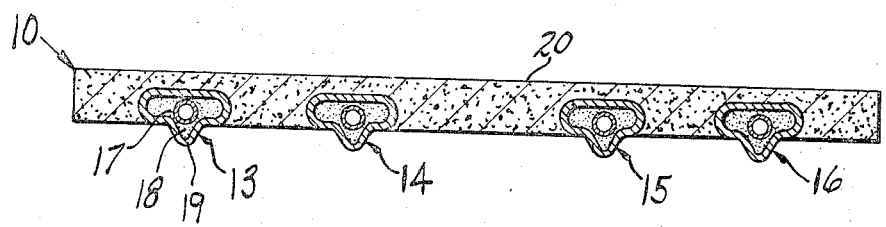
FIGURE 2 is a cross-section of the unit of FIGURE 1 taken along the lines II—II of FIGURE 1.

As is best shown in FIGURE 2, the heating element 11 is at least partially embedded within the confines of the heating unit 10. The element 11, portions of which are shown in FIGURE 2 and referenced by the characters 13, 14, 15 and 16, may be of any of the well-known types. That shown is of a standard type and comprises a central core of resistance wire 17, an insulating material 18—such as "Magnorite," a magnesium oxide refractory composition—the resistance wire 17 and insulating material 18 being surrounded by a metallic sheath 19. As will be evident, the cross-section of the heating element 11 may be of any desired configuration, that shown being merely exemplary. The heating coil 11 is embedded within a body of pervious material 20, formed in a manner to be indicated hereinafter. As shown, the heating element 11 is only partially surrounded by the body of pervious material 20. It will be understood that by appropriate mounting means the heating unit 10 may be positioned in the desired relationship and connection made for supply of electrical power to the heating element 11.

Figure 3:
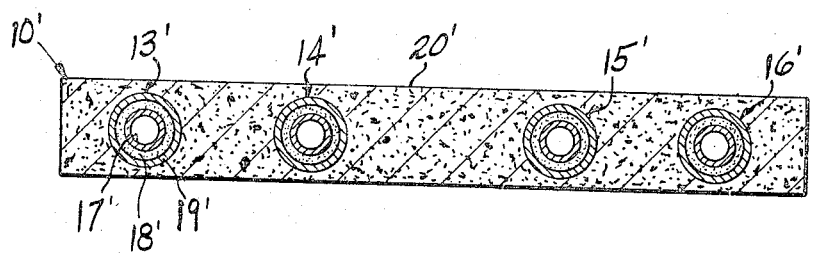
FIGURE 3 is a cross-section similar to FIGURE 2 showing a modification of the instant invention.

In FIGURE 3 there is shown a modification of the instant invention, wherein the heating coil is embedded within the pervious body except where it exits for connection to a power source and completely surrrounded by a pervious body. Thus, employing the reference characters of FIGURE 2 primed for analogous structure, the heating unit 10' comprises a heating element, portions of which are shown at 13', 14', 15' and 16', comprising a resistance wire 17', an insulating material 18', completely surrounded by particles of the pervious body heating coil embedded in the pervious body 20' being and an outer metallic sheath 19', the portions of the 20'. Such construction provides a greater amount of heat exchange surface of the pervious material, and accordingly more opportunity for heat exchange. Such construction is particularly advantageous when the device is used as a space heater or immersion heater, for the fluids flowing through the pervious body have increased opportunity for convection of heat.

Considering now the pervious body itself, it is to be noted that the particles of such body may be either metallic or non-metallic, dependent upon the ultimate use of the resultant structure. Materials which will effectively conduct heat from the electric coil are to be preferred, and accordingly the particles may be of stainless steels, coppers, brass, carbon steels, aluminums, or various combinations thereof.

Various methods may be employed in constructing the instant heating unit. Whatever method is employed, the heating coil is prepared for bonding by thoroughly cleaning any oxide film from the outer metal sheath. In order to secure a satisfactory metallic bond between the particles of the pervious body and the electric heating coil, it is preferred that the particles be poured by gravity into an appropriately shaped confined space about the heating element appropriately positioned within the space. The particles may then be vibrated to cause them to compact uniformly. As is obvious, the choice of particle size will largely determine the size of openings in the resultant pervious body. The body of particles so packed may then be treated in accordance with any of the well known metallurgy practices—e.g., sintering or welding, or brazing or soldering employing an appropriate coating—to produce a metallic bond between the various particles of the pervious body and the heating element embedded therein. Thus, there is provided about the heating element a pervious body whose bulk density, or apparent density, is but a fraction of the density of the metal or alloy from which the particles are obtained.

While the process noted above is preferred, formation of the pervious body may be accomplished in other fashions. For example, it is possible to blend intimately a particulate material with either a combustible substance or a soluble material whose melting point exceeds the sintering temperature of the particulate material. After the blend is compacted and treated to achieve a metallic bond, the combustible substance may be burned away or the soluble material removed by leaching or dissolving with a liquid. A still further method of producing the pervious body comprises melting a metal or alloy and casting it into the interstices of a loose aggregate of a particulate soluble material whose melting point exceeds that of the metal, preferably having a specific gravity of the molten metal. Upon solidification of the metal, a component is produced which contains the network of the soluble material interspersed within the solid metal which soluble material is thereupon removed by leaching or dissolving, leaving behind it interstices that interconnect and form a pervious network within the resultant body. A still further method of producing such pervious bodies comprises weaving or knitting metal wire into a mesh arranged in a plurality of layers. According to this process, a control of porosity is obtained by appropriate choice of wire diameters and openings arranged between adjoining wires as well as the juxtapositioning of superimposed layers of the woven or knit mesh.

If so desired, a plate of the pervious material may be formed apart from the heating coil, the heating coil subsequently laid upon such a preformed plate, loose particles added to partially cover or completely cover the coil, and the resulting assembly treated by any of the processes indicated above.

It will be evident that upon energization of the heating element 11, heat generated within the portion of the element embedded in the pervious body 20 will be conducted throughout the heating unit 10 through the various particles of the pervious body 20. Thus, an even distribution of the heat generated is achieved. Additionally, as the body 20 is of a pervious material, any heat exchange medium flowing therethrough will additionally achieve heat exchange through convection, thus substantially increasing the attainable heat flow. Since a greater amount of heat is dissipated, higher watt densities may be employed in the instant device as compared to the prior art structures, without overheating the electrical elements. Also, in the case of certain volatile and/or combustible fluids, higher watt densities may be employed with safety, as the lower temperatures obtained will prevent "flash-backs" and/or ignition.

It is to be understood that the invention is not limited to the illustrations described and shown herein which are deemed to be merely illustrative of the best modes of carrying out the invention, and which are susceptible of modifications of form, size, arrangement of parts and detail of operation, but rather is intended to encompass all such modifications which are within the spirit and scope of the invention as set forth in the appended claims.

What is claimed is:

1. A heating unit for use in electric ranges consisting essentially of
   (A) a pervious metallic plate, and
   (B) an electric heating element completely embedded in said pervious plate and joined thereto by a metallic bond,
whereby uniform heat distribution is obtained in said plate during operation, and heat conduction to heating utensils placed on said plate is facilitated.

2. A heating unit according to claim 1 wherein said heating element comprises an insulated resistance wire encased in a tubular metal sheath.

3. A heating unit according to claim 1 wherein said pervious plate comprises a plurality of discrete particles joined together by a metallic bond.

References Cited

UNITED STATES PATENTS

| | | | |
|---|---|---|---|
| 796,684 | 8/1905 | Thomson | 338—223 X |
| 1,349,131 | 8/1920 | Hadaway | 219—465 X |
| 2,401,797 | 6/1946 | Rasmussen | 165—180 X |
| 2,727,632 | 12/1955 | Mack | 210—113.5 |
| 2,851,572 | 9/1958 | Steck | 219—464 X |

FOREIGN PATENTS 531,112  12/1940  Great Britain.

RICHARD M. WOOD, *Primary Examiner.*

V. Y. MAYEWSKY, *Assistant Examiner.*

UNITED STATES PATENT OFFICE

CERTIFICATE OF CORRECTION

Patent No. 3,349,224                          October 24, 1967

Ulric R. Jaeger

It is hereby certified that error appears in the above numbered patent requiring correction and that the said Letters Patent should read as corrected below.

Column 1, line 35, for "previous" read -- pervious --; column 2, line 38, beginning with "completely" strike out all to and including "20′." in line 41 and insert instead -- and an outer metallic sheath 19′, the portions of the heating coil embedded in the pervious body 20′ being completely surrounded by particles of the pervious body 20′ . --.

Signed and sealed this 5th day of November 1968.

(SEAL)
Attest:

Edward M. Fletcher, Jr.                         EDWARD J. BRENNER

Attesting Officer                             Commissioner of Patents